US006958966B2

(12) United States Patent
Tateishi et al.

(10) Patent No.: US 6,958,966 B2
(45) Date of Patent: Oct. 25, 2005

(54) CONTROL DEVICE FOR OPTICAL DISK PLAYER THAT CORRECTS ROTATIONAL FREQUENCY DATA BASED ON INPUT DATA

(75) Inventors: Kiyoshi Tateishi, Tsurugashima (JP); Ichiro Sugai, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 321 days.

(21) Appl. No.: 10/379,678

(22) Filed: Mar. 6, 2003

(65) Prior Publication Data

US 2003/0174614 A1 Sep. 18, 2003

(30) Foreign Application Priority Data

Mar. 14, 2002 (JP) ............................ 2002-069847

(51) Int. Cl.[7] ................................................ G11B 7/00

(52) U.S. Cl. ............... 369/53.3; 369/47.48; 369/47.49; 369/53.34; 369/47.35; 369/44.11

(58) Field of Search ........................... 369/53.3, 47.48, 369/47.49, 53.34, 47.35, 44.11

(56) References Cited

U.S. PATENT DOCUMENTS 5,224,086 A * 6/1993 Wachi ..................... 369/47.44
5,335,189 A * 8/1994 Takayama et al. ............ 702/96
5,590,111 A * 12/1996 Kirino et al. ............ 369/47.53
5,875,163 A * 2/1999 Kuroda et al. ........... 369/47.48
5,896,353 A * 4/1999 Naohara .................. 369/44.25
5,920,531 A * 7/1999 Tamura et al. ........... 369/47.46
5,956,307 A * 9/1999 Koudo et al. ............ 369/47.43
6,304,531 B1 * 10/2001 Koudo et al. ............ 369/47.23
6,381,292 B1 * 4/2002 Yamakoshi ................. 375/376
6,603,720 B1 * 8/2003 Kuroda et al. ........... 369/53.23

* cited by examiner

*Primary Examiner*—William Korzuch
*Assistant Examiner*—Van Pham
(74) *Attorney, Agent, or Firm*—Sughrue Mion, PLLC

(57) ABSTRACT

An optical disc player having an optical pickup records and retrieves information on an optical disc while the optical disc is rotating. A rotation pulse is generated each time the optical disc rotates through a prescribed angle. A rotation frequency data representing a frequency of the rotation pulse is also generated. A servo processor performs servo processing for rotation control on the optical disc in accordance with the rotation frequency data. A sampling pulse generator performs computational processing on an input data signal to generate a sampling pulse. The sampling pulse generator also corrects the rotation frequency data based on a phase error between the sampling pulse and the rotation pulse to use a corrected rotation frequency data as the input data signal. Another servo processor performs servo processing for repetitive control on the optical pickup using the sampling pulse.

6 Claims, 2 Drawing Sheets

CONTROL DEVICE FOR OPTICAL DISK PLAYER THAT CORRECTS ROTATIONAL FREQUENCY DATA BASED ON INPUT DATA

BACKGROUND OF THE INVENTION

1. Field of the Invention

This invention relates to a control device in an optical disc player that records and plays back (reproduces) information on and from an optical disc serving as a data recording medium.

2. Description of the Related Art

Optical discs are used as media for recording audio signals and video signals. The optical discs form rows of pits on the disc surface as tracks to record information. When retrieving (playing back) the recorded information from the optical disc, the pit rows are detected by an optical pickup and converted into electrical signals. The electric signals are then used as the audio signals and video signals to reproduce the recorded sound and image.

During the reproduction of the recorded information, the optical disc is rotated at a high speed by, for example, a spindle motor, and the rotating speed of the spindle motor is accurately controlled by a rotation rate control circuit. Also, the optical pickup is controlled by a focusing servo and a tracking servo in order to accurately detect pit rows.

In this specification, spindle motor rotation rate control is referred to as "spindle control", and various control servo operations for the optical pickup are referred to as "repetitive control". The repetitive control is one method of achieving high-precision control processing in ordinary control systems. The repetitive control method takes advantage of a fact that when the input signals to the control system are repetitions of substantially the same waveform, the input signals are a repeated waveform. In the repetitive control method, therefore, every time the repetition of the input signal occurs, the preceding control deviation is reflected in the control at that instant. When such repetitive control is applied to a focusing servo, tracking servo or a similar operation during optical disc recording and reproduction, errors which occur in synchronization with the rotation period of the optical disc and arise from optical disc eccentricity and runout can be eliminated.

FIG. 1 of the attached drawings illustrates a block diagram of the configuration of a control circuit to perform the control described above in a conventional optical disc player.

In the figure, an optical disc 10 is a recording medium, with various information recorded in pit rows provided on the surface of the optical disc. A spindle motor 11 is a motor to rotate the optical disc 10 at high speed during information reproduction. The rotation rate can be freely controlled by means of a rotation rate control command. A spindle motor rotation rate detector 12 includes, for example, a rotary encoder and an associated processing circuit, and generates a spindle motor rotation rate detection pulse (hereafter called simply an "FG (frequency generator) pulse") upon each rotation of the spindle motor 11 through a prescribed angle. The processing circuit processes a detection signal resulting from the rotary encoder.

A rotation frequency detector 13 is a circuit to detect the rotation frequency of the spindle motor 11, based on the FG pulses supplied by the spindle motor rotation rate detector 12. A spindle motor controller 14 is a circuit which generates a rotation control command so as to rotate the spindle motor 11 at a desired speed, based on the frequency detected by the rotation frequency detector 13. A spindle motor driver 15 is a motor driving circuit that includes, for example, a power transistor, power FET or the like, and controls the spindle motor 11 to rotate at a rotation rate based on the rotation rate control command from the spindle motor controller 14.

A PLL controller 16 is a signal frequency-multiplier circuit utilizing a PLL (phase-locked loop) circuit. In the PLL controller, the FG pulse supplied from the spindle motor rotation rate detector 12 is multiplied by a prescribed value, to generate a sampling pulse required by a repetitive control unit 17, described below. The repetitive control unit 17 receives various error input signals supplied from an optical pickup driver (not shown), such as tracking error signals and focusing error signals, in synchronization with the sampling pulse, and executes the prescribed repetitive control. The execution of the repetitive control is accompanied by the output from the repetitive control unit 17 of various control signals to servomechanisms and actuator mechanisms of the optical pickup driver. By this means, focusing servo, tracking servo, and other servo control of the optical pickup is performed.

As described above, in a conventional optical disc player the circuit components which handle the spindle control and repetitive control are configured independently, thereby creating a problem of an increased number of component parts in the optical disc player. The PLL controller 16 is normally an analog circuit including a phase comparator, loop filter, and VCO (voltage-controlled oscillator), as taught in Japanese Patent Kokai (Laid-open publication) No. 9-35289. Consequently it has been difficult to incorporate the circuitry in an LSI device, and this difficulty has impeded efforts to reduce the size and the power consumption of an optical disc player itself.

SUMMARY OF THE INVENTION

An object of this invention is to provide a control device for an optical disc player, which can reduce the number of component parts and which can be incorporated in an LSI device.

According to one aspect of the present invention, there is provided a control device for an optical disc player having an optical pickup to record and retrieve information on an optical disc, the control device comprising: a rotation pulse generator for generating a rotation pulse each time the optical disc rotates through a prescribed angle; a rotation frequency data signal generator for generating a rotation frequency data signal indicating a frequency of the rotation pulse; a rotation control servo processor for performing servo processing for rotation control of the optical disc; a sampling pulse generator for performing computational processing on an input data signal to generate a sampling pulse, and correcting a data value of the rotation frequency data signal based on a phase error between the sampling pulse and the rotation pulse to use a corrected rotation frequency data signal as the input data signal; and a repetitive control servo processor for performing servo processing for repetitive control on the optical pickup using the sampling pulse.

DETAILED DESCRIPTION OF THE INVENTION

An embodiment of a control device 1 for an optical disc player according to this invention will be described with reference to FIG. 2.

Figure 1:
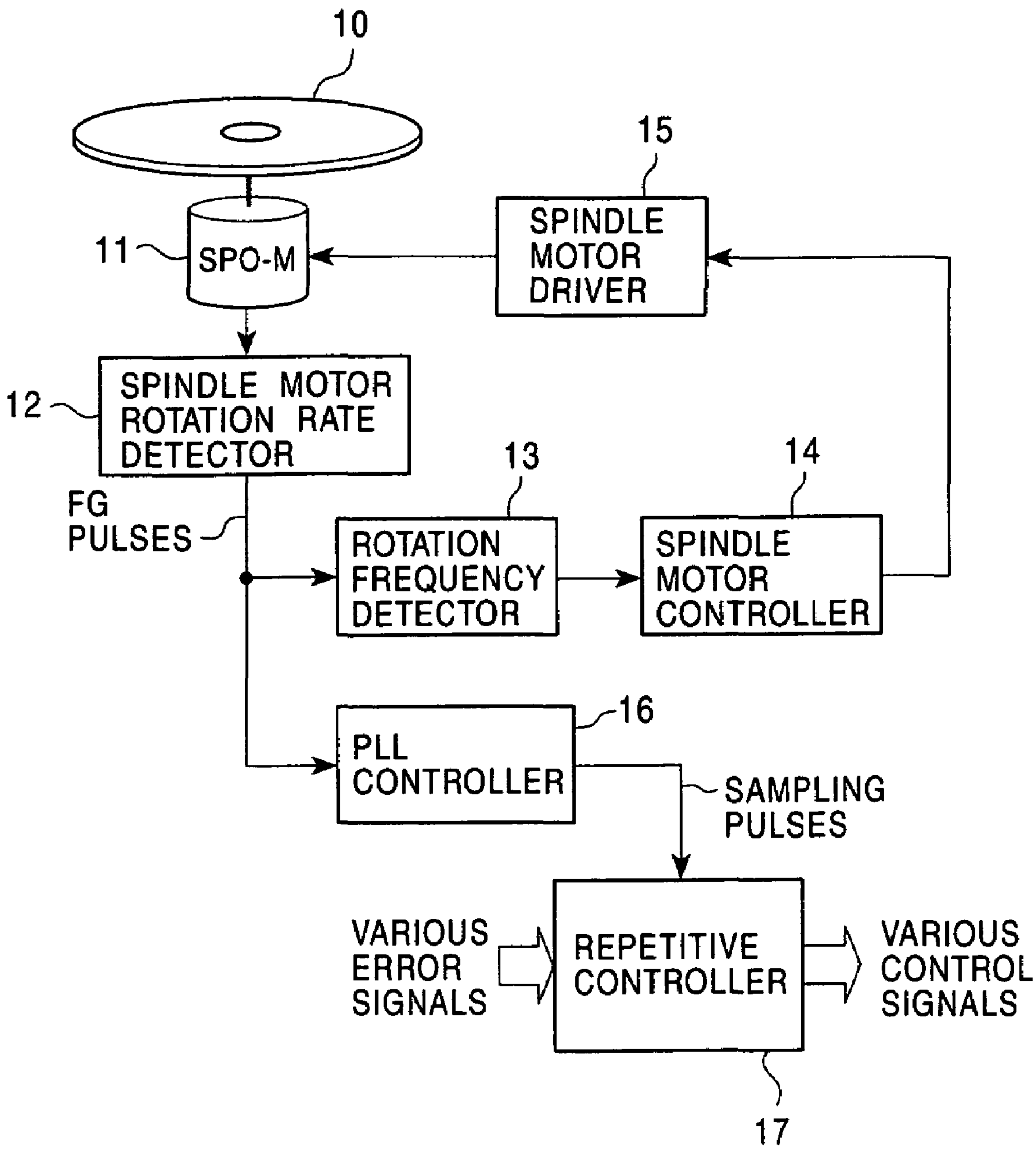
FIG. 1 is a block diagram showing the configuration of the spindle controller and the repetitive control unit in a conventional optical disc player.

In this drawing, component parts such as the spindle motor 11 which are the same as those shown in FIG. 1 are assigned the same symbols, and a description thereof is omitted in order to avoid redundant descriptions.

Figure 2:
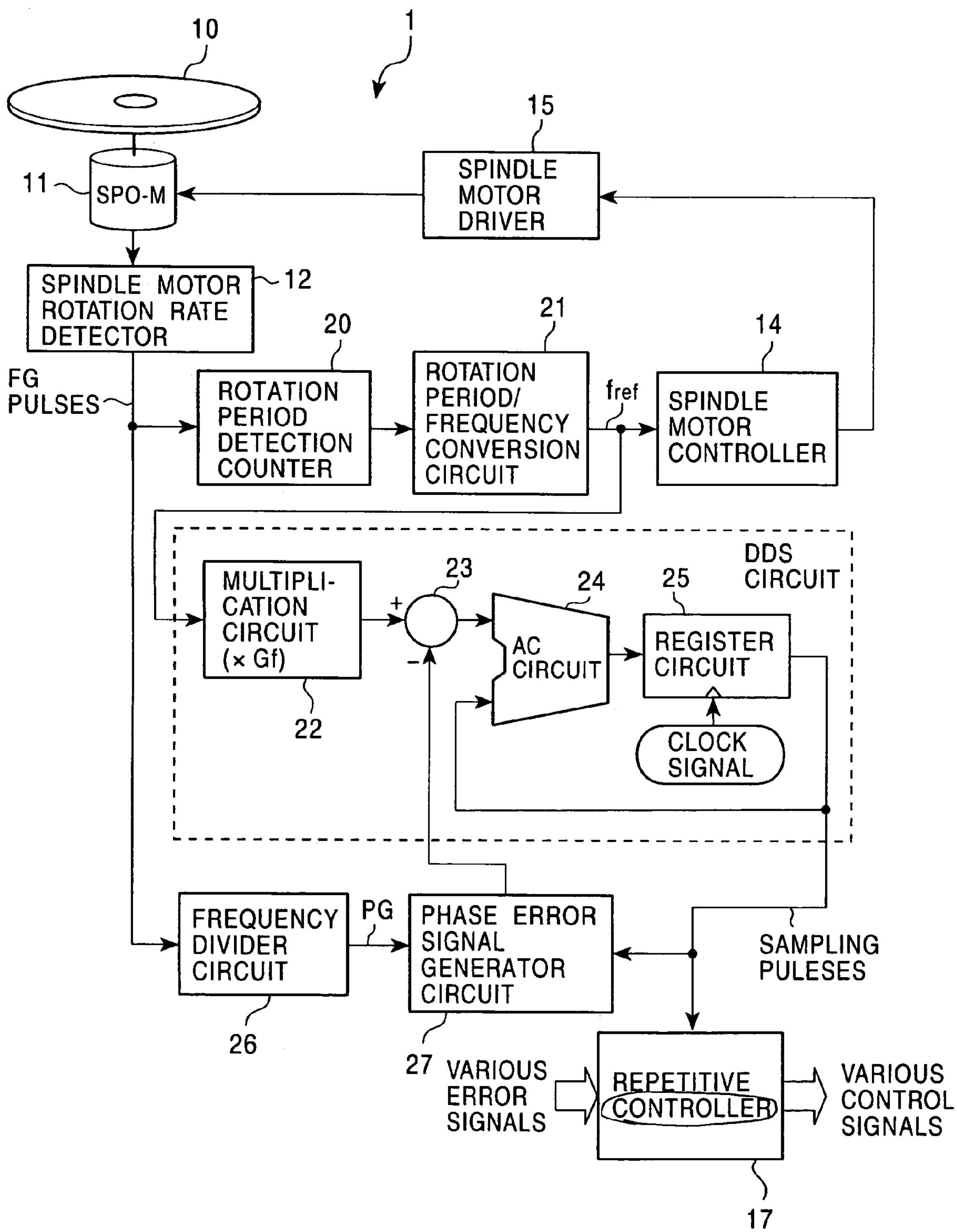
FIG. 2 is a block diagram showing an embodiment of an optical disc player control device according to one embodiment of the present invention.

In FIG. 2, a rotation period detection counter 20 is a counting circuit which uses, for example, the clock pulse from a quartz oscillator circuit with an accurate oscillation frequency as count pulses to count the length of one period of FG pulses. A rotation period/frequency conversion circuit 21 is a circuit which converts the rotation period of the spindle motor 11 detected by the rotation period detection counter 20 into a digital rotation frequency $f_{ref}$.

The rotation frequency $f_{ref}$ is supplied to the spindle motor controller 14. In the spindle motor controller 14, the rotation rate of the spindle motor 11 is controlled based on the rotation frequency $f_{ref}$. In this embodiment, the rotation frequency $f_{ref}$ is also supplied to a multiplier circuit 22. The multiplier circuit 22 is a circuit which multiplies the rotation frequency $f_{ref}$ by a predetermined constant.

An adder-subtracter circuit 23 is a computation circuit which performs addition and subtraction of signals output from the multiplier circuit 22 and phase error signals, described below. An accumulator circuit 24 and a register circuit 25 form a so-called accumulator with a prescribed bit length, which is a circuit to perform addition and accumulation of the computation results of the adder-subtracter circuit 23 using a prescribed clock signal. A prescribed bit of the digital sawtooth signal output from the register circuit 25 of the accumulator is extracted as a sampling pulse for repetitive control and is supplied to the repetitive control unit 17.

The multiplier circuit 22, adder-subtracter circuit 23, accumulator circuit 24, and register circuit 25 form a signal frequency multiplier circuit employing the so-called direct digital synthesizer method (hereafter simply called the "DDS method").

A frequency divider circuit 26 is a circuit for frequency division of FG pulses by a prescribed ratio. Signals PG which have been frequency-divided by this circuit 26 are supplied to a phase error signal generator circuit 27. The phase error signal generator circuit 27 compares signals output from the accumulator with the signals PG output from the frequency divider circuit 26 to extract a phase error component therebetween. The phase error signal generator circuit 27 then generates a phase error signal to be supplied to the adder-subtracter circuit 23.

Next, operation of the control device 1 will be described.

Suppose that the spindle motor rotation speed detector 12 outputs, as FG pulses, six pulses for one rotation of the spindle motor 11. Hence, if the number of rotations per unit time of the spindle motor 11 is $f_{rot}$, then the number of FG pulses per unit time is given by the equation (1) below:

$$FG=6\times f_{rot} \tag{1}$$

The FG pulses are first supplied to the rotation period detection counter 20. The rotation period detection counter 20 uses a counter clock obtained by, for example, frequency division by an appropriate frequency divider of a reference clock from a quartz oscillator or similar. In the following description, it is assumed that the reference clock is 66 MHz and the division ratio of the frequency divider is 1/64. In other words, the rotation period detection counter 20 counts the FG pulse period with a clock obtained by dividing 66 MHz by 64 (approximately 1.03 MHz). Hence, if the FG pulse period is $G_{FG}$, then $G_{FG}$ is obtained from the equation (2) below:

$$G_{FG}=66000000/(64\times 6\times f_{rot}) \tag{2}$$

It should be noted that the number of output pulses per rotation and values of the reference clock and division ratio are merely examples, and the present embodiment is not limited to these numerical values.

The period $G_{FG}$ of the FG pulses detected by the rotation period detection counter 20 is supplied to the rotation period/frequency conversion circuit 21. The rotation period/frequency conversion circuit 21 is a circuit which converts the period $G_{FG}$ of FG pulses into a frequency $f_{ref}$ corresponding to the period. The FG pulse frequency $f_{ref}$ is computed utilizing the fact that the period T of a periodic signal and the frequency f are generally related as follows.

$$T=1/f$$

In other words, the rotation period/frequency conversion circuit 21 is a divider circuit. As indicated by the equation (3) below, by dividing a prescribed constant K by the FG pulse period $G_{FG}$, the circuit 21 calculates the FG pulse frequency $f_{ref}$:

$$f_{ref}=K/G_{FG} \tag{3}$$

The frequency $f_{ref}$ computed by the rotation period/frequency conversion circuit 21 is supplied to the multiplier circuit 22, and is multiplied by a prescribed constant Gf to generate a multiplication signal ($f_{ref}\times$Gf). In this embodiment, the constant Gf is the value 8 ($8=2^3$). With this constant Gf, the digital value $f_{ref}$ is shifted by three bits toward the MSB (most significant bit). The value of the multiplying constant Gf is selected to achieve a higher calculation precision, given the specific setting of the division numerator K in the rotation period/frequency conversion circuit 21 and the fact that the bit length of the register circuit 25 of the accumulator, described below, is 32 bits. It does not mean that the constant Gf is limited to this value.

The multiplication signal generated by the multiplier circuit 22 is provided to the adder-subtracter circuit 23, and a phase error signal, described below, is added to the multiplication signal, and the resulting value is output to the accumulator circuit 24. The phase error signal is added as a negative feedback signal to the adder-subtracter circuit 23 in order to phase-lock the sampling pulse for repetitive control resulting from multiplication of the FG pulses; hence the computation performed in the adder-subtracter circuit 23 is in actuality subtraction.

As mentioned earlier, the accumulator circuit 24, together with the next-stage register circuit 25, forms the accumulator which accumulates input data based on a prescribed clock. The accumulator in this embodiment uses a clock frequency of 25 kHz. A feedback loop extends from the register circuit 25 to the accumulator circuit 24. Consequently the signal ($f_{ref}\times$Gf) supplied from the adder-subtracter circuit 23 with this clock period is sequentially accumulated in the accumulator circuit 24 by the feedback loop of the register circuit 25. The accumulator bit length is 32 bits, and the parameters (not shown) of each part of the accumulators are set such that the accumulated value overflows with the rotation period of the spindle motor 11 and starts again from zero.

As described above, the multiplier circuit 22, adder-subtracter circuit 23, accumulator circuit 24, and register circuit 25 form a signal frequency multiplier circuit based on the DDS method. Hence, a digital sawtooth waveform appears in the output, synchronized with the clock frequency (25 kHz), and with a resolution of one bit of the accumulator. The value of the clock frequency in this embodiment, as well as the accumulator bit length and other settings, are not limited to the above numerical values.

In this embodiment, as a result of using the above accumulator, the following relation is obtained:

$$f_{ref} \times Gf \times 25000 = 2^{32} \times f_{rot} \quad (4)$$

Upon substitution of the equations (2) and (3) into the equation (4), the relation $$K \times \{(64 \times 6 \times f_{rot})/66 \times 10^6\} \times 8 \times 25 \times 10^3 = 2^{32} \times f_{rot}$$

is derived.

Rearranging the above equation in terms of the constant K, $$K = 2^{32}/1.163636363 \ldots$$

That is, $K \approx 3690987520$ so that the value of K satisfies the relation $$2^{31} < K < 2^{32}$$

Consequently if bit 31, which is the MSB, of the digital sawtooth waveform output from the accumulator is extracted, a pulse can be obtained with the same frequency as $f_{rot}$, and if bit 30 is extracted, a pulse can be obtained at twice the frequency of $f_{rot}$. In other words, by performing the DDS method multiplication on the FG pulse, it is possible to obtain a pulse signal having the value of the rotation rate $f_{rot}$ of the spindle motor 11, arbitrarily multiplied.

In this embodiment, bit 24 of the accumulator output is extracted, and is supplied as a sampling pulse to the repetitive control unit 17. That is, as the sampling pulse for repetitive control, a pulse signal obtained by multiplying the rotation rate $f_{rot}$ of the spindle motor 11 by a factor $$2^{(31-24)} = 2^7 = 128$$

is supplied. As described above, in this embodiment FG pulse multiplication employs the DDS method, so that a stable sampling pulse is obtained.

The FG pulse output from the spindle motor rotation rate detector 12 is also supplied to the frequency division circuit 26. The frequency division circuit 26 is a frequency division circuit including, for example, a binary counter and shift counter. In this particular embodiment, the division ratio is assumed to be set to ⅙. Hence, the frequency PGf of the output signal of the frequency divider circuit 26 (hereafter simply called the PG signal) is obtained by the equation (1) as follows:

$$PGf = FG/6 = 6 \times f_{rot}/6 = f_{rot}$$

and so is the original value of the rotation rate of the spindle motor 11.

The phase error signal generation circuit 27 compares the phases of the PG signal output from the frequency divider circuit 26 and bit 31 (the MSB) of the output signal from the accumulator. The phase error signal generation circuit 27 then generates a phase error signal to lock the frequency of the sampling pulse for repetitive control obtained by multiplying the FG pulse. The phase error signal is fed back to the adder-subtracter circuit 23.

Specific numerical values for this embodiment are indicated below. The phase error signal generator circuit 27 extracts the signals of bits 16 to 31 of the digital sawtooth output signal from the accumulator in synchronization with the PG signal, and supplies the extracted signals, as signed 16-bit-valued phase error signals, to the adder-subtracter circuit 23. By feeding this phase error signal back to the adder-subtracter circuit 23, the PG signals and the accumulator overflow are synchronized. It should be noted that the signal bits and other settings indicated above are no more than an example, and the present embodiment is not limited to these numerical values.

In the process of supplying phase error signals from the phase error signal generator circuit 27 to the adder-subtracter circuit 23, ordinarily a low-pass filter to suppress aliasing noise, an amplifier circuit to adjust the loop gain of the feedback loop, and similar component(s) are utilized. However, these components are not directly related to the operation of this embodiment, and so descriptions thereof are omitted from this specification.

In the embodiment shown in FIG. 2, in order to facilitate understanding of the concept of this invention, the configuration is shown by a hardware block diagram; however, the present invention is not limited to this configuration. For example, an appropriate DSP (digital signal processor) may be used for signal processing of FG pulses and other signals, so that the configuration shown in FIG. 2 may be achieved through software processing.

This application is based on a Japanese patent application No. 2002-69847, and the entire disclosure thereof is incorporated herein by reference.

What is claimed is:

1. A control device for an optical disc player which, while rotating an optical disc, records and reproduces information on the optical disc by using an optical pickup, the control device comprising:

a rotation pulse generator for generating a rotation pulse each time the optical disc rotates through a prescribed angle;

a rotation frequency data signal generator for generating a rotation frequency data signal representing a frequency of the rotation pulse;

a rotation control servo processor for performing servo processing for rotation control of the optical disc;

a sampling pulse generator for performing computational processing on an input data signal to generate a sampling pulse, and correcting a data value of the rotation frequency data signal based on a phase error between the sampling pulse and the rotation pulse to use a corrected rotation frequency data signal as the input data signal; and a repetitive control servo processor for performing servo processing for repetitive control on the optical pickup using the sampling pulse.

2. The optical disc player control device according to claim 1, wherein the sampling pulse generator performs frequency multiplication processing using a direct digital synthesizing method as the computational processing.

3. The optical disc player control device according to claim 1, wherein the sampling pulse generator comprises:

a multiplier circuit, which multiplies the rotation frequency data signal by a prescribed constant to generate a multiplication signal;

an adder-subtracter circuit, which adds the multiplication signal and the phase error signal or subtracts the phase error signal from the multiplication signal, to generate the input data signal;

an accumulation circuit, which performs accumulation processing on the input data signal using a prescribed clock signal to generate the sampling pulse;

a frequency divider circuit, which divides the rotation pulse at a prescribed ratio to generate a frequency-divided pulse; and a phase error generator circuit which compares a phase of the sampling pulse with a phase of the frequency-divided pulse to generate the phase error signal.

4. A method of controlling an optical disc player having an optical pickup to record and retrieve information on an optical disc, comprising:

generating a rotation pulse each time the optical disc rotates through a prescribed angle;

generating a rotation frequency data signal representing a frequency of the rotation pulse;

performing servo processing for rotation control of the optical disc;

performing computational processing on an input data signal to generate a sampling pulse, and correcting a data value of the rotation frequency data signal based on a phase error between the sampling pulse and the rotation pulse to use a corrected rotation frequency data signal as the input data signal; and performing servo processing for repetitive control on the optical pickup using the sampling pulse.

5. The method according to claim 4, wherein a frequency multiplication processing using a direct digital synthesizing method performs the computational processing.

6. The method according to claim 4, wherein the generating of the sampling pulse comprises:

multiplying the rotation frequency data signal by a prescribed constant to generate a multiplication signal;

adding the multiplication signal and the phase error signal or subtracting the phase error signal from the multiplication signal, to generate the input data signal;

performing accumulation processing on the input data signal using a prescribed clock signal to generate the sampling pulse;

dividing the rotation pulse at a prescribed ratio to generate a frequency-divided pulse; and comparing a phase of the sampling pulse with a phase of the frequency-divided pulse to generate the phase error signal.

* * * * *